April 25, 1967 J. R. HALL 3,316,483

BRIDGE TYPE PHASE CORRECTOR FOR WAVE TRANSMISSION NETWORKS

Filed Dec. 18, 1964

INVENTOR
JAMES ROBERT HALL
BY John V. Regan
ATTORNEY

United States Patent Office 3,316,483

Patented Apr. 25, 1967

3,316,483

BRIDGE TYPE PHASE CORRECTOR FOR WAVE TRANSMISSION NETWORKS

James R. Hall, Canoga Park, Calif., assignor to Radio Corporation of America, a corporation of Delaware Filed Dec. 18, 1964, Ser. No. 419,364

4 Claims. (Cl. 323—123)

This invention relates to signal transmission circuits and, more particularly, to all pass-networks of the type used as phase correctors.

In the transmission of a complex signal waveform, one having a plurality of frequency components within a particular time period, it often happens that the waveform becomes phase distorted. Phase distortion can be minimized by allowing phase to vary directly with frequency. Circuits wherein the phase of the output varies with the frequency of the input are generally known as phase correctors. Phase corrector circuits are particularly useful in television signal processing equipment, in the read-out portion of a magnetic recording system, and in other like systems wherein phase correction is necessary.

Many well-known phase corrector circuits are designed such that they should ideally be connected to a load having an infinite impedance. Practically, it is impossible to obtain a very high or infinite impedance. For example, in a typical video system when the frequency is in the neighborhood of ten megacycles, the stray capacitance of the stage being fed by the phase corrector circuit acts to lower the effective load impedance of the phase corrector circuit.

It is an object of this invention to provide a phase shift from 0 to 180 degrees as the frequency of the input signal varies and to provide a constant gain over the same frequency range.

It is another object of this invention to provide a phase corrector circuit which operates in a current mode as distinct from prior art types which operate in a voltage mode.

It is yet another object of this invention to provide a phase corrector circuit capable of driving a low impedance load.

In accordance with this invention, there is provided a bridge network having first, second and third equal value resistive arms and a fourth reactive arm. A load having a low impedance relative to the value of any one of the resistive arms is coupled between first and second junctions defined by the first and third resistive arms and by the second resistive and fourth reactive arms, respectively. A current generator means responsive to an input waveform having one or more frequency components is provided for applying to a third junction defined by the third resistive and the fourth reactive arms a current whose magnitude is determined by the magnitude of the currents flowing in the first and second resistive arms.

Figure 1:
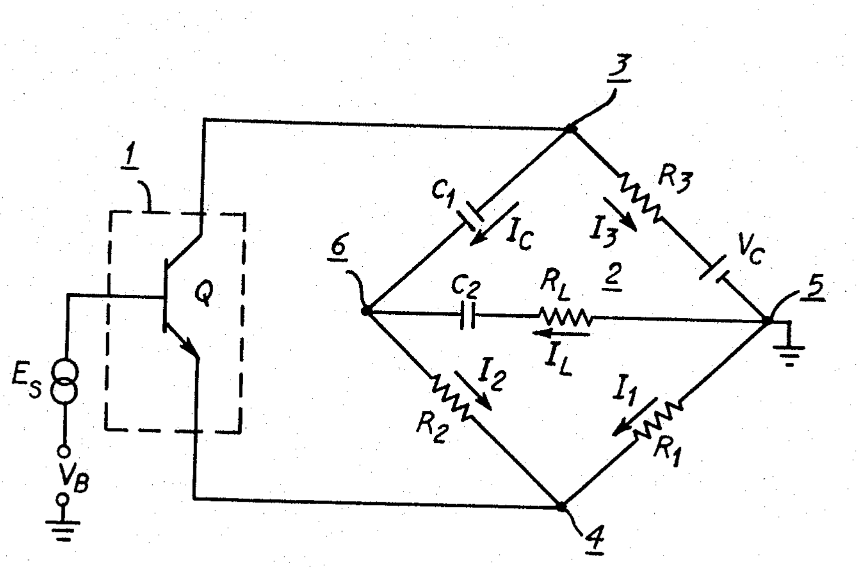
FIG. 1 is a schematic circuit diagram of this invention.

In FIG. 1 a current generator 1 is connected to a bridge network 2 at junctions 3 and 4. Although the current generator 1 is illustrated as an NPN transistor Q having its collector and emitter coupled to junctions 3 and 4, respectively and its base connected to a signal waveform means $E_S$, it is apparent to those skilled in the art that a PNP transistor could be used. Moreover, the current generator 1 may be any well-known current generating device. For example, the current generator could be a pentode vacuum tube or a field effect semiconductor device.

In the bridge network a resistor R3 is connected in a third arm of the bridge between junction 3 and junction 5. The battery $V_c$ is connected in this arm of the bridge to provide operating potential for the transistor Q. A resistor $R_1$ is connected in a first arm of the bridge between junctions 4 and 5. A resistor $R_2$ is connected in a second arm of the bridge between junctions 4 and 6. A capacitor $C_1$ provides the reactive element and is connected in a fourth arm of the bridge between junctions 3 and 6. A load resistor $R_L$ is coupled between junctions 5 and 6 of the bridge. The capacitor $C_2$, connected in series with load resistor $R_L$, is a D.C. blocking capacitor. The load resistor $R_L$ may be the input resistance of a transistor circuit or may be any other suitable utilization device.

The circuit operation can best be understood from a consideration of the currents in the various arms of the bridge 2. The currents $I_1$, $I_2$, $I_3$, $I_C$ and $I_L$ are indicated by their respective arrows in FIG. 1. If the reactance of capacitor $C_2$ and the resistance of $R_L$ are very small relative to resistance $R_2$, substantially all of the signal voltage $E_S$ transmitted through the base to emitter junction of transistor Q appears across $R_2$ and $R_1$ in parallel. Consequently, the currents $I_1$ and $I_2$ are in phase with input signal $E_S$ and are constant in magnitude relative to the magnitude of $E_S$. These two currents $I_1$ and $I_2$ are summed at junction 4 and applied to junction 3 by the current generator 1. Thus, resistors $R_1$ and $R_2$ function as a current source for the current generator.

In the two arms of the bridge coupled to junction 3, resistance $R_3$ is large relative to the load impedance and capacitor $C_1$ is small relative to the D.C. blocking capacitor $C_2$. For very low values of frequency, the reactance of capacitor $C_1$, being large relative to resistance $R_3$, acts as an open circuit. Thus, current $I_C$ is nearly zero and current $I_3$ is equal to the sum of currents $I_1$ and $I_2$. An analysis of the currents flowing into and out of junction 6 reveals that:

$$I_L = I_2 - I_C \tag{1}$$

Since $I_C$ is zero, $$I_L = I_2 \tag{2}$$

Consequently, load current $I_L$ is in phase with the signal $E_S$ for very low frequencies.

For very high frequencies the reactance or $C_1$, being very small relative to resistance $R_3$, acts as a short circuit. Consequently, current $I_3$ is nearly zero and current $I_C$ is equal to the sum of currents $I_1$ and $I_2$. Since $I_C$ is the sum of $I_1$ and $I_2$, Equation 1 may be expressed as:

$$I_L = I_2 - (I_1 + I_2) \tag{3}$$

or $$I_L = I_1 \tag{4}$$

If current $I_1$ is equal to current $I_2$ ($R_1 = R_2$), the gain is constant, i.e., the magnitude of the load current $I_L$ is constant relative to or directly proportional to the magnitude of the input signal waveform. Thus, for $R_1 = R_2$ the load current magnitude is directly proportional to the magnitude of the input signal for all frequencies and the load current phase varies from 0 to 180 degrees as the frequency varies from near zero to near infinite frequency.

Figure 2:
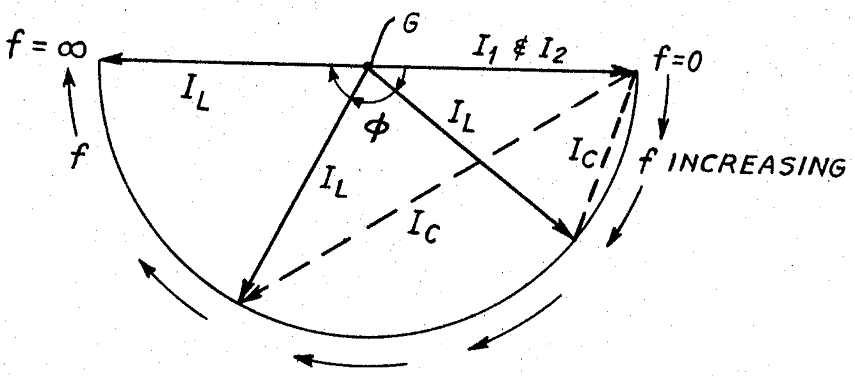
FIG. 2 is a phase diagram of the currents present in the various branches of the circuit of FIG. 1.

FIG. 2 is a phase diagram of currents $I_1$, $I_2$, $I_L$ and $I_C$ further illustrating the operation of the invention. The vector marked $I_1$ & $I_2$ is derived from a reference point G and is considered to be in phase with the input signal. The vector $I_L$ is seen to describe a semicircle having a radius equal to the absolute value of $I_1$ or $I_2$ as the frequency increases. When the frequency is zero, the load current vector $I_L$ superimposed on vector $I_2$ and the capacitor current vector $I_C$ is zero. As the frequency increases, vector $I_C$ increases in magnitude and vector $I_L$ rotates by phase angle $\phi$ away from vector $I_2$. As the frequency approaches infinity, the phase angle $\phi$ of vector $I_L$ approaches 180 degrees and vector $I_C$ approaches a magnitude twice the magnitude of vectors $I_1$, $I_2$ and $I_L$.

The connection of the capacitor $C_1$ between junctions 3 and 6 is very important and advantageous to the current mode operation of the phase corrector. Due to the constant magnitude of currents $I_1$ and $I_2$ for all values of frequency relative to the magnitude of the input waveform, the load current vector also remains constant as shown by Equations 2 and 4 and by the phase diagram in FIG. 2. If capacitor $C_1$ and resistance $R_2$ were interchanged, the current magnitude at junction 4 and in the load would not be constant for all values of frequency. In fact the current at junction 4 would be equal to $I_1$ at zero frequency and would become very large as the frequency increases, resulting in unstable nonlinear operation of the current source. Although a voltage mode phase corrector circuit could be constructed in this manner by making the load impedance very large, the previously-mentioned disadvantage of stray capacity effectively reducing the impedance at the output is encountered.

It is apparent to those skilled in the art that resistors $R_1$ and $R_2$ need not be equal. If $R_1$ is less than $R_2$ such that $I_1$ is greater than $I_2$, it is evident from Equations 2 and 4 that the load current $I_L$ experiences gain as the frequency increases. Similarly, if $R_1$ is greater than $R_2$ such that $I_1$ is less than $I_2$, it is evident that load current $I_L$ is attenuated as the frequency increases.

It is also apparent to those skilled in the art that an over-all voltage gain may be achieved by coupling the load current $I_L$ to the input of a low input impedance amplifier, such as a common base transistor amplifier or any suitable operational amplifier.

What is claimed is:

1. An electrical circuit comprising a bridge network having first, second and third resistive arms and a fourth reactive arm, a load having a low impedance relative to the value of any one of said resistive arms coupled between first and second junctions defined by said first and third resistive arms and by said second resistive and said fourth reactive arms respectively, said third resistive and said fourth reactive arms being coupled to a third junction, said first and second resistive arms being coupled to a fourth junction, and generator means responsive to an input waveform for applying a current to said third junction and a voltage to said fourth junction, said current having a magnitude determined by the sum of the currents in said first and second resistive arms.

2. An electricad circuit comprising a bridge network having first and second equal value resistive arms, a third resistive arm, and a fourth reactive arm, a load having a low impedance relative to the value of any one of said resistive arms coupled between first and second junctions defined by said first and third resistive arms and by said second resistive and said fourth reactive arms respectively, said third resistive and said fourth reactive arms being coupled to a third junction, said first and second resistive arms being coupled to a fourth junction, and generator means responsive to an input waveform for applying a current to said third junction and a voltage to said fourth junction, said current having a magnitude determined by the sum of the currents in said first and second resistive arms.

3. An electrical circuit comprising a bridge network having first, second and third resistive arms and a fourth reactive arm, a load having a low impedance relative to the value of any one of said resistive arms coupled between first and second junctions defined by said first and third resistive arms and by said second resistive and said fourth reactive arms respectively, said third resistive and said fourth reactive arms being coupled to a third junction, said first and second resistive arms being coupled to a fourth junction, generator means responsive to an input waveform having a plurality of frequency components within a particular time period for applying a current to said third junction and a voltage to said fourth junction, said current having a magnitude determined by the sum of the currents in said first and second resistive arms, said generator means including a transistor having its collector and emitter electrodes coupled to said third and fourth junctions, respectively, and means for applying said waveform to the base electrode of said transistor.

4. An electrical circuit comprising a bridge network having first and second equal value resistive arms, a third resistive arm, and a fourth reactive arm, a load having a low impedance relative to the value of any one of said resistive arms coupled between first and second junctions defined by said first and third resistive arms and by said second resistive and said fourth reactive arms respectively, said third resistive and said fourth reactive arms being coupled to a third junction, said first and second resistive arms being coupled to a fourth junction, generator means responsive to an input waveform having a plurality of frequency components within a particular time period for applying a current to said third junction and a voltage to said fourth junction, said current having a magnitude determined by the sum of the currents in said first and second resistive arms, said generator means including a transistor having its collector and emitter electrodes coupled to said third and fourth junctions, respectively, and means for applying said waveform to the base electrode of said transistor.

References Cited by the Examiner

UNITED STATES PATENTS

| | | | |
|---|---|---|---|
| 1,800,962 | 4/1931 | Scheppmann | 333—74 X |
| 2,414,475 | 1/1947 | Marchand | 323—123 X |
| 2,561,455 | 7/1951 | Zschokke | 323—123 X |
| 3,010,087 | 11/1961 | Ebbe et al. | 333—74 X |

JOHN F. COUCH, *Primary Examiner.*

A. D. PELLINEN, *Assistant Examiner.*